May 4, 1954  C. F. JOHNSEN  2,677,589
ECCENTRIC INDEX ARM FOR MEASURING INSTRUMENTS
Filed Feb. 5, 1953  2 Sheets-Sheet 1
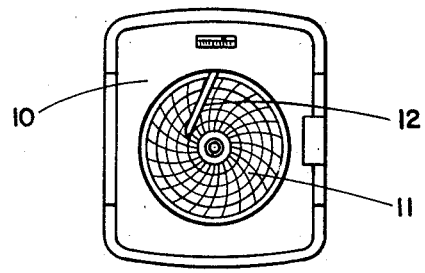
FIG. I
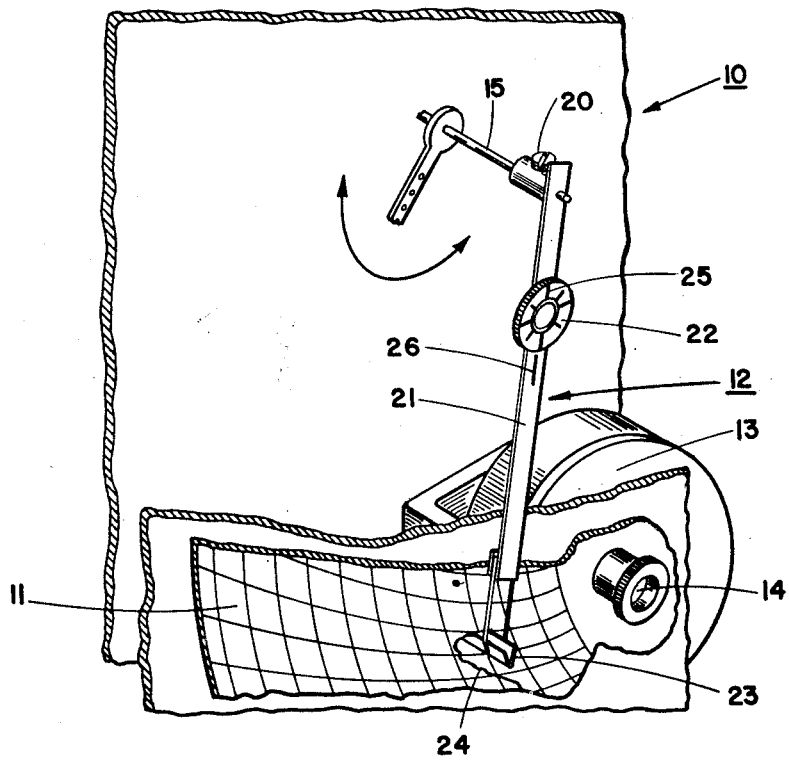
FIG. II
INVENTOR.
C. FREDERICK JOHNSEN
BY
Curtis, Morris & Safford
ATTORNEYS

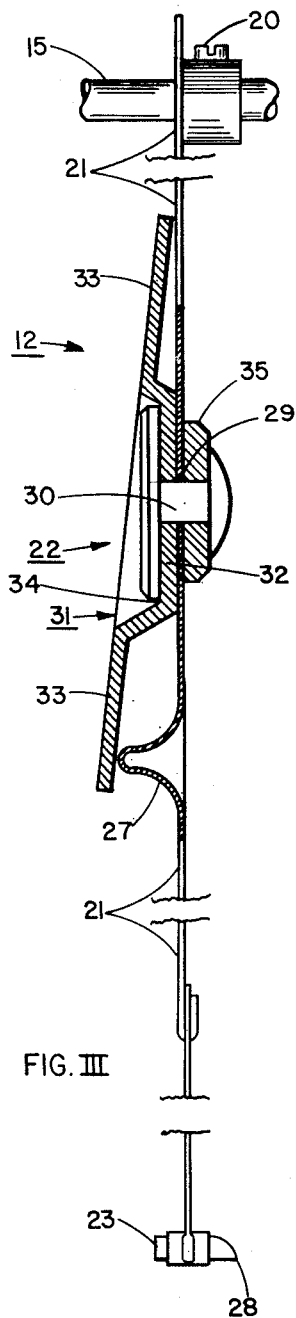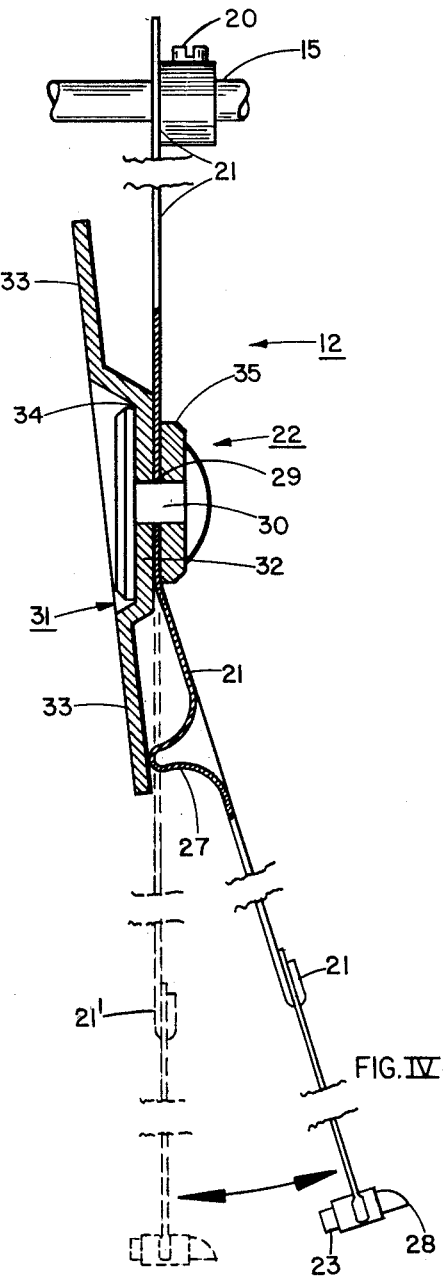

Patented May 4, 1954

2,677,589

UNITED STATES PATENT OFFICE 2,677,589

ECCENTRIC INDEX ARM FOR MEASURING INSTRUMENTS

Christian Frederick Johnsen, Foxboro, Mass., assignor to The Foxboro Company, Foxboro, Mass., a corporation of Massachusetts Application February 5, 1953, Serial No. 335,259

1 Claim. (Cl. 346—139)

This invention relates to measuring instruments wherein an index arm unit is driven in relation to changes in a variable condition such as temperature, pressure, flow, and the like. In particular, this invention relates to a new and improved index arm arrangement for use in such instruments, for example, a pointer, a set arm, or a pen arm.

In industrial instrumentation especially, it is desirable to use lightweight and delicate driving and driven elements in order to measure accurately small power responses to changes in variable conditions.

In the use of index arms in any of such instruments, a problem is presented in adjustment of the arms. These arms are driven in a predetermined plane in response to changes in a variable condition. They may be so driven along a scale, or over a record chart as in the case of a pen arm. The adjustment problem relates to the position of these arms with respect to such scales or charts, in a direction at right angles to the predetermined plane of driven movement of the particular arm. In the case of the pen arm, for example, adjustment is desirable to provide an efficient engagement pressure of the pen on the record chart.

A prior method of accomplishing this adjustment with lightweight index arms has been to bend the arm between two fingers toward or away from the chart or scale. This action changes the lengthwise contour of the arm, and with the driven end of the arm in a fixed position, changes the contour of the arm in such a direction that the position or pressure of the arm with respect to its associated scales or chart may be varied.

This method presents certain problems and dangers. The adjustment so made is difficult to even approximately measure or duplicate. The pen should be positioned substantially perpendicular to the chart to maintain its proper position in relation to the variable condition value and time. A twist of the pen arm easily changes such a position. Manual bending of the arm is very likely to result in so twisting the arm as to tilt or misalign the pen or other index arm in this manner.

This invention provides a device which obviates these problems and dangers by means of a simple, inexpensive, and effective adjustment device in the form of a cam mounted on the index arm in an arrangement for flexing the arm in a direction at right angles to the predetermined plane of driven movement of the arm.

It is, therefore, an object of this invention to provide a new and improved measurement instrument index arm unit.

Another object of this invention is to provide new and improved means for adjusting such an index arm.

These and other objects of this invention will be in part pointed out and will be in part apparent from the text and claim here presented and from the accompanying drawings, in which:

Figure I is a general exterior view of a measuring instrument embodying this invention;

Figure II is a showing of a pen arm unit embodying this invention, with fragmentary showings of the mounting and driving mechanism for the unit and the chart with which the pen cooperates;

Figure III is a showing of the pen arm unit of Figure II, in partial, longitudinally central section, with an enlarged portion illustrating a cam unit as an embodiment of this invention, in one position of adjustment; and Figure IV is a section like that of Figure III, with the unit in another position of adjustment.

Referring to Figure I, a measuring instrument 10, of the recorder type, is shown with a rotatable chart 11 thereon and an index arm pen unit 12 overlying the chart. In Figure II the pen unit 12 of Figure I is shown in association with a fragment of the instrument 10 of Figure I, including a fragment of the rotatable chart 11. The chart is driven by a motor 13 through a hub 14, and the pen unit is driven radially across the chart from a shaft 15 in response to changes in a variable condition.

The pen arm unit 12 is secured to the shaft 15 by means of a set screw arrangement 20, and comprises a pen arm 21, a rotatable adjustment cam 22, and a pen 23 which draws a record such as line 24 on the chart 11. With the pen arm unit 12 rigidly held on the driving shaft 15, adjustment of the pressure of the pen 23 on the chart 11 may be accomplished through the operation of the adjustment cam 22. The cam 22 has indicia 25 thereon for association with a reference mark 26 on the pen arm 21 as a means of indicating the amount of rotation of the cam and therefore the amount of adjustment which has been applied to the pen arm 21. The pen arm adjustment is translated into pressure of the pen 23 on the chart 11, and the indicia 25 provides an indication of this pressure. Thus a measurement of pen pressure is provided, for pen setting or replacement.

Figures III and IV show the pen unit 12 as a whole, with the adjustment cam unit 22 and its operation in detail by means of longitudinally central partial sections of the arm unit, taken perpendicular to the predetermined plane of driven movement of the arm unit, with the cam unit portion enlarged.

The arm 21 is a single piece of flat, flexible strip metal extending from the driving shaft 15 to the pen 23. The adjustment arrangement for flexing the pen arm 21 in a direction perpendicular to the plane of predetermined driven movement of the arm, is located adjacent the driving shaft 15. This arrangement comprises the cam unit 22 and a boss 27 extending outwardly from the arm 21 from a point on the longitudinal center line of the arm and in a direction at right angles to the driven movement of the arm. The cam unit 22, as it is rotated, bears on the boss to flex the pen arm 21 toward the chart, that is, counterclockwise as seen in Figures III and IV, and as the cam unit is rotated further, the pen arm 21 is allowed to move away from the chart under the bias built up in the pen arm itself by the cam unit 22 in flexing the pen toward the chart. The chart 11 is not shown in Figures III and IV. The amount of movement of the arm 21, as seen by comparing Figures III and IV, is indicative of the amount of pressure which may be applied as between the pen and the chart. The pen 23 is of the common V type which tapers to a point 28 from which the ink flows to form the record line 24 of Figure II, on the chart 11.

The pen arm 21 is provided with an opening 29 therethrough, adjacent the boss 27 on the longitudinal center line of the pen arm, and between the boss 27 and the driving shaft 15. The opening 29 is cylindrical and receives the cam unit 22 for rotation therein about an axis generally parallel to the boss 27 and the driven shaft 15.

The cam unit 22 comprises a headed pin 30 with the head on the same side of the pen arm as is the boss 27 and with the body of the pin extending through the arm opening 29. On the boss side of the arm 21, a cam disc 31 is rotatably mounted on the pin 30 and in engagement with the arm 21 and with the boss 27. The cam disc 31 is formed with an arm engaging, central, circular portion 32 which is flat to the flat of the pen arm, and a boss engaging disc portion 33 which is tilted at a substantial angle with respect to the pen arm and which has the under side of its peripheral edge overlying the boss 27 and in engagement therewith. The cam disc 31 is provided with a recess 34 for receiving the head of the pin 30 with the recess bottom parallel to the pen arm flat surface which the cam disc engages. The body of the pin 30 is peened over against a washer 35 which bears on the side of the pen arm opposite the boss 27, to hold the cam unit 22 together as a rotatable assembly in the pen arm opening 29. Thus the boss engaging portion 33 of the cam disc 31 has a high point area and a low point area with respect to the pen arm 21 and the boss 27. Either or both the cam disc 31 and the washer 35 may be formed of soapy surface material such as nylon to reduce friction in the rotation of the disc, and the disc and/or the washer may be provided with raised portions in friction reducing contact with the pen arm 21.

In the position shown in Figure III the pen arm 21 is straight, with the high point area of the cam disc 31 overlying the boss 27. In this position, the action of the cam disc on the pen arm is negligible. As the disc 31 is manually adjusted in rotation to the position shown in Figure IV, the pen arm 21 is bent from the dotted line position 21', to the solid line position as shown. With the pen 23 in engagement with a chart, such movement would be translated into increasing pressure of the pen point 28 against the chart. Thereafter, as the disc 31 is manually rotated further, the high point area of the disc 31 again overlies the boss 27, the flexible pen arm 21 returns to the dotted line position 21', and the pressure of the pen against the chart is diminished. The pen may be adjusted to any desired position, that is, pressure, between these extreme adjustments of the pen arm, simply by rotating the cam disc 31 so as to engage the boss 27 with a point of intermediate height of the cam disc portion 33.

This invention, therefore, provides a novel measuring instrument index arm unit in which the arm is adjustable in a direction at right angles to the predetermined plane of driven movement of the arm unit by means of a cam mounted on the index arm.

As many embodiments may be made in the above invention, and as many changes may be made in the embodiments above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

In a recording instrument, a pen arm unit comprising, in combination, a flexible arm which is driven in a predetermined plane in response to changes in a variable condition, a boss on said arm extending therefrom in a direction at right angles to said predetermined plane, and a cam unit rotatably mounted on said arm adjacent said boss on an axis parallel thereto, with said cam unit in engagement with said boss to flex said arm in a direction at right angles to said predetermined plane as said cam unit is rotated, said cam unit comprising a cam disc having an arm engaging portion parallel to said arm and a cam portion at a substantial angle with respect to said arm and in engagement with said boss, and a pivot pin extending through said arm and through said cam disc.

References Cited in the file of this patent

UNITED STATES PATENTS

| Number | Name | Date |
| --- | --- | --- |
| 1,630,296 | Heesch | May 31, 1927 |
| 2,040,501 | Sawford | May 12, 1936 |
| 2,080,443 | Sperberg | May 18, 1937 |
| 2,107,317 | Wiggers | Feb. 8, 1938 |